US006963357B2

(12) United States Patent
Semones

(10) Patent No.: US 6,963,357 B2
(45) Date of Patent: Nov. 8, 2005

(54) COMMUNICATION MONITORING SYSTEM AND METHOD

(76) Inventor: David Christopher Semones, 1110 N. May Dr., Palm Springs, CA (US) 92262

( * ) Notice: Subject to any disclaimer, the term of this patent is extended or adjusted under 35 U.S.C. 154(b) by 718 days.

(21) Appl. No.: 10/147,377

(22) Filed: May 15, 2002

(65) Prior Publication Data

US 2002/0171735 A1 Nov. 21, 2002

Related U.S. Application Data

(60) Provisional application No. 60/291,062, filed on May 15, 2001, provisional application No. 60/291,689, filed on May 17, 2001, and provisional application No. 60/292,491, filed on May 21, 2001.

(51) Int. Cl.[7] .......... H04N 7/18; H04N 9/47

(52) U.S. Cl. .......... 348/143

(58) Field of Search .......... 348/143, 150, 348/151, 156, 161, 162, 125, 135, 201.99; 340/569; H04N 7/18, 9/47

(56) References Cited

U.S. PATENT DOCUMENTS

| | | | | |
|---|---|---|---|---|
| 3,611,333 A | | 10/1971 | Conigliaro | |
| 3,707,260 A | | 12/1972 | Gelineau | |
| 4,101,877 A | | 7/1978 | Rush | |
| 4,520,350 A | | 5/1985 | Huang | |
| 4,633,236 A | | 12/1986 | Buhl | |
| 4,794,377 A | | 12/1988 | Benages | |
| 4,868,543 A | | 9/1989 | Binkley | |
| 4,872,210 A | | 10/1989 | Benages | |
| 4,894,717 A | * | 1/1990 | Komei | 348/150 |
| 5,023,595 A | | 6/1991 | Bennett | |
| 5,036,310 A | | 7/1991 | Russell | |
| 5,239,305 A | | 8/1993 | Murphy | |
| 5,369,258 A | * | 11/1994 | Sansone et al. | 235/381 |
| 5,377,906 A | | 1/1995 | Mason | |
| 5,440,294 A | | 8/1995 | Mercier | |
| 5,713,270 A | | 2/1998 | Fitzgerald | |
| 5,774,053 A | | 6/1998 | Porter | |
| 5,825,413 A | | 10/1998 | Mullis | |
| 5,829,349 A | | 11/1998 | Fitzgerald | |
| 5,917,411 A | | 6/1999 | Baggarly | |
| 5,950,919 A | | 9/1999 | Adams | |
| 6,046,675 A | | 4/2000 | Hanna | |
| 6,105,006 A | * | 8/2000 | Davis et al. | 705/35 |
| 6,114,959 A | | 9/2000 | Bennett | |
| 6,206,724 B1 | | 3/2001 | Leung | |
| 6,275,154 B1 | * | 8/2001 | Bennett et al. | 340/569 |
| 6,305,603 B1 | * | 10/2001 | Grunbok, Jr. | 235/379 |
| 6,307,472 B1 | | 10/2001 | Robertson | |
| 6,330,856 B1 | | 12/2001 | Fitzgerald | |
| 6,336,587 B1 | * | 1/2002 | He et al. | 235/462.45 |
| 6,450,406 B2 | * | 9/2002 | Brown | 235/462.45 |
| 6,462,659 B1 | * | 10/2002 | Schuette | 340/569 |
| 6,483,433 B2 | * | 11/2002 | Moskowitz et al. | 340/568.1 |
| 6,524,846 B1 | * | 2/2003 | Robinson, Jr. | 435/287.4 |
| 6,554,184 B1 | * | 4/2003 | Amos | 235/379 |
| 6,744,463 B2 | * | 6/2004 | Rye et al. | 348/159 |
| 6,823,173 B2 | * | 11/2004 | Srey et al. | 455/59 |
| 2002/0024438 A1 | * | 2/2002 | Roberson | 340/569 |
| 2002/0067262 A1 | * | 6/2002 | Lie | 340/569 |
| 2002/0103868 A1 | * | 8/2002 | Khan | 709/206 |
| 2004/0022668 A1 | * | 2/2004 | Kitchen | 422/22 |

* cited by examiner

*Primary Examiner*—Nhon Diep

(57) ABSTRACT

An anti-terrorist communication monitoring device and method for providing a user with a data regarding a content of a communication system is provided. The device includes a sensor to provide the data regarding the content of the communication system, a wireless transmitter including a power supply, a video camera, and a microphone, and a wireless receiver including a security processor to provide an anti-terrorist function, a video monitor to provide for a display of the data regarding the content of the communication system, and a circuit to decode and generate an image, wherein said image is to be displayed on said video monitor.

33 Claims, 3 Drawing Sheets

COMMUNICATION MONITORING SYSTEM AND METHOD

Priority of U.S. Provisional Application No. 60/291,062, filed on May 15, 2001, U.S. Provisional Application No. 60/291,689, filed on May 17, 2001, and U.S. Provisional Application No. 60/292,491, filed on May 21, 2001, is claimed under 35 U.S.C. '119(e), entitled The Mailbox Monitor by David Christopher Semones, the entire contents of which is hereby incorporated by reference.

BACKGROUND OF THE INVENTION

1.Field of the Invention

The present invention relates to communication monitoring devices and methods, and more particularly to a postal mailbox monitoring system and method.

2. Brief Description of the Related Art

The United States Postal Service (USPS) regulations specify the properties of a United States mailbox including any information regarding add on features. As such, any novel invention to be used in a United States mailbox must be approved by the USPS. Currently, the state of the art lacks an electronic mailbox monitoring system which is approved by the USPS to be used in a mailbox.

As the danger of receiving a dangerous letter in the mail is an issue more and more addressed today, there is a continuing growing need for a device for a mailbox which would provide anti-terrorist functionality as well as a monitoring function. In keeping with recent USPS (United States Postal Service) regulations as outlined in the New Standard USPS-STD-7B that was recently published into Law in February 2001 in the US Federal Register, the present invention is designed to be attached to existing or new USPS approved privately owned, rented/leased mailboxes; including attached to publicly owned mailboxes (if desired by the USPS).

In certain countries the size and placement of the wireless transmitter functionality can be adjusted so as to conform with the different regulations of each countries government from around the world. The present invention may also use a HF Radio signaling to send uniquely coded information about the mailbox, the use of a pulsed infrared beam of light to determined the opening and closing of the carrier service door; the use of a video camera and encoder to "capture" image(s) or streams of video of the inside of the mailbox, and similarly a means by which streams of audio can be captured from the mailbox.

The presently claimed invention has many advantages over the prior art. This invention provides for the monitoring and identification of the contents of a communication system, such as a United States Postal Service mailbox, and an anti-terrorist functional.

SUMMARY OF THE INVENTION

According to a first exemplary embodiment, an anti-terrorist communication monitoring device for providing a user with a data regarding a content of a communication system is provided. The device includes a sensor to provide the data regarding the content of the communication system, a wireless transmitter including a power supply, a video camera, and a microphone, and a wireless receiver including a security processor to provide an anti-terrorist function, a video monitor to provide for a display of the data regarding the content of the communication system, and a circuit to decode and generate an image, wherein said image is to be displayed on said video monitor.

In another embodiment is provided a method for monitoring a communication system to provide a user with a data corresponding to a content of the communication system. The method includes the following steps of: scanning the content via a sensor to provide the data regarding the content of the communication system, transmitting the data via a wireless transmitter, receiving the data via a wireless receiver including a security processor to provide an anti-terrorist function, a video monitor to display the data; and generating an image, wherein said image corresponds to the data.

In yet another embodiment is disclosed a computer readable medium containing programming which when executed performs the following procedures: scanning a content of a communication system to provide a data regarding the content of the communication system, transmitting the data via a wireless transmitter, receiving the data via a wireless receiver including a security processor to provide an anti-terrorist function, a video monitor to display the data, and generating an image, wherein the image corresponds to the data.

An advantage of the invention is providing the unique identifier which allows both the transmitter and receiver to talk to each other without interference from other similar devices in other mailboxes. The mailbox monitoring system captures an IR-bathed image(s) and/or audio stream which is sent digitally back to the receiver to be interactively or directly displayed on the built-in video monitor; this function happens automatically when the carrier service door is opened even a slight bit. The mailbox monitoring system has the been equipped with R.C.A. jacks, and a wireless 2 line speaker telephone & answering machine system. The receiver has voice recognition command features along with touch screen programming features.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF PREFERRED EMBODIMENTS

Figure 1:
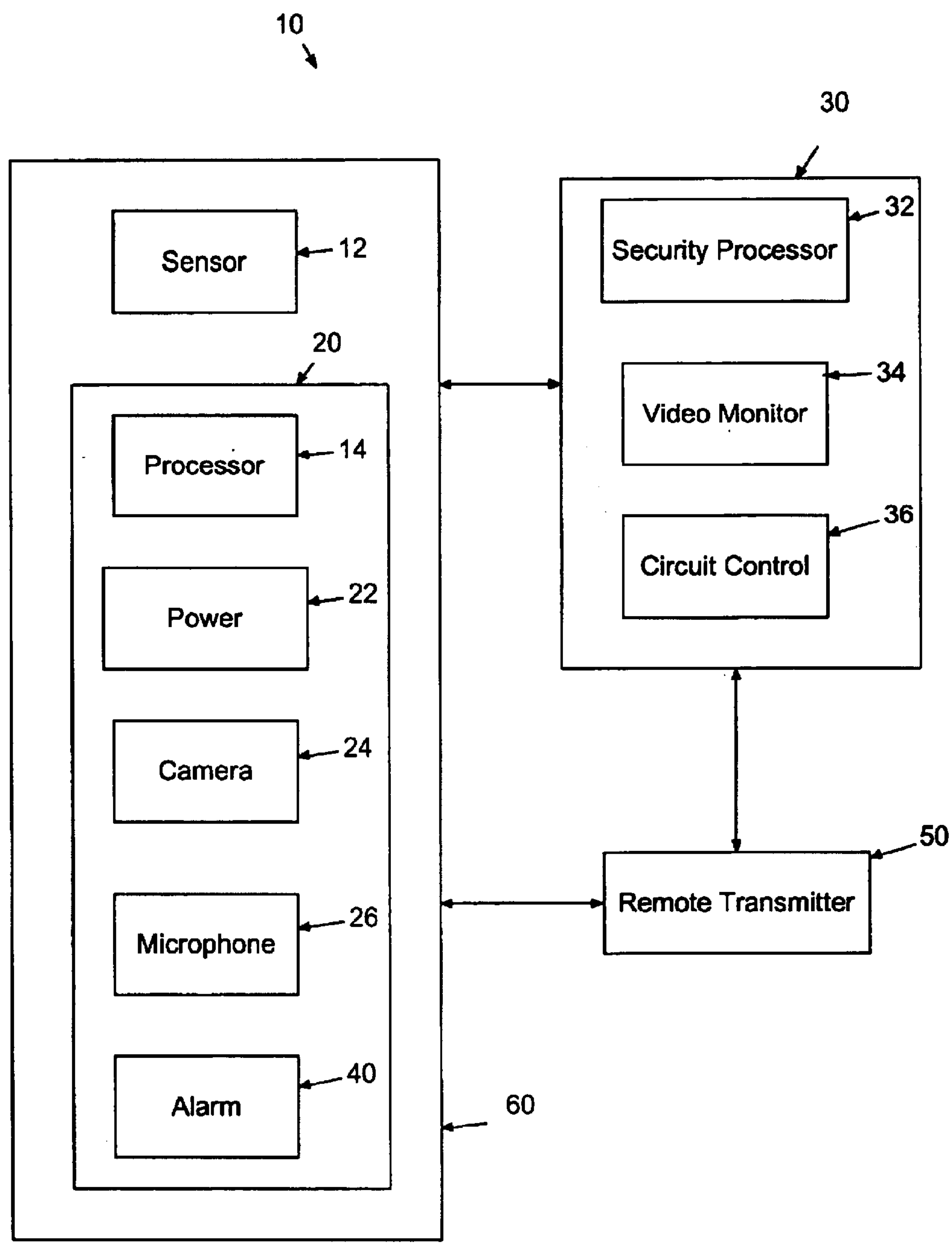
FIG. 1 illustrates an anti-terrorist communication monitoring device for providing a user with a data regarding a content of a communication system.

Referring to the drawing figures, like reference numerals designate identical or corresponding elements throughout the several figures.

The invention provided is an anti-terrorist communication monitoring device for providing a user with a data regarding a content of a communication system. FIG. 1 illustrates the device 10 including a sensor 12, a wireless transmitter 20, and a wireless receiver 30. By way of example and not by limitation, the wireless transmitter 20 may include a microprocessor 14, power supply 22, a video camera 24, and a microphone 26. The wireless receiver 30 may include a security processor 32, a video monitor 34, and a circuit 36. The circuit 36 decodes and generates an image to be displayed on the video monitor 34. This functionality provides an anti-terrorist feature of monitoring a communication device, such as a mailbox. The video monitor 34 displays the data acquired regarding the content of the communication system, for example, whether an item is present in the communication system and what the items contents may be.

In embodiment of the present invention the communication system is a United States Postal Service mailbox. The anti-terrorist monitoring device 10 is designed to conveniently provide the user of the mailbox with automatic information about the mailbox. The device 10 may have a "Direct Information Request Feature" to provide the user with information regarding their mailbox(s) via a networking environment, such as the World Wide Web or Internet, cellular telecommunications, remote computers, alphanumeric pagers, and other wireless devices worldwide.

The wireless receiver 30 includes the circuit 36 to decode the information received via a transmitted signal or email commands. The transmission procedure may use a unique identifier code to ensure reception of the proper mailbox signal. In another embodiment, a user friendly interactive voice recognition program provides the user access to information about their mailbox. The wireless receiver 30 may include the functionality of communicating with another remote transmitter 50 not in the same location as the wireless transmitter 20. The remote transmitter 50 may include Infrared technology. By way of example and not limitation, the remote transmitter 50 may be a TV/VCR "Infrared clicker".

The mailbox monitoring device 10 has a built in preprogrammed anti-theft and anti-vandalism deterrent system using microprocessors coupled with the wireless transmitter 20 and wireless receiver 30. The user may activate commands to the wireless transmitter 20 via sequence coding, voice commands directly from the wireless receiver 30, network computing systems such as an Internet based computer, cellular telecommunication, alphanumeric pagers, and other wireless devices from any location, provided signal strength is sufficient for transmission between devices to occur.

The wireless transmitter 20 includes an HF radio signal scheme to provide a unique identification code information corresponding to the particular wireless transmitter 20. This process ensures transmission integrity. The microprocessor 14 retrieves data regarding the mailbox 60. The wireless transmitter 20 may be an unlicensed (low output power) type unless the transmitter is distant from the dwelling, which may warrant the use of a higher-power licensed transmitter.

The power supply 22 may be an internal battery charged by solar energy during the day and on Moonlit nights. The power supply 22 provides power to maintain the wireless transmitter 20 by the use of modern solar cell technologies. The sensor 12 may be an Infrared sensor including a focused infrared light beam, that when bounced off of the inside of the mailbox 60 carrier service door, returns without loss when the door is closed. When the mailbox 60 carrier service door opened even slightly, the beam passes out without reflecting which, as disclosed in an embodiment of the present invention, initiates an alarm. An infrared emitter/receiver pair may be used as is well known in the art. In some case where the mailbox 60 can not accept the transmitter mounted or built inside, (because of regulated minimum space requirements) a small hole is drilled through the top rear of the mailbox 60 to provide for the IR beam and video camera with microphone to "see" and "hear" in the mailbox 60. The beam is sent near the top of the mailbox 60, so that no returning echo will occur if the mailbox 60 carrier service door is partially opened.

In yet another embodiment, a miniature video camera 24 is used to capture an image, snapshot, or steam of video of the mailbox 60. Capture of such image may be initiated after the alarm has been initiated. This may be activated by the user regardless of if the alarm has been activated or not. Using the IR emitter as a "light" source, a snapshot or video of the inside of the mailbox 60 and/or contents is captured and transmitted via the wireless transmitter 20. A microphone 26 may capture audio streams corresponding to the mailbox 60. Such audio streams may also be transmitted via the wireless transmitter 20.

The wireless transmitter 20 includes a microprocessor 14 to receive commands from the wireless receiver 30 to activate a functions. The wireless transmitter 20 may include a preprogrammed anti-theft and anti-vandalism deterrent system designed to deter and prevent criminal acts on the incoming or outgoing mail and/or the mailbox itself. This system is designed to activate the alarm 40 and may initiate preprogrammed commands such as the step of recording images or audible sound files received by the wireless receiver 30. Such transmitted data may be stored by the wireless receiver 30. The alarm 40 may be triggered if the wireless transmitter 20 is removed and/or disassembled from its location without first being directed to disarm itself by the authorized user with the correct password(s) or deactivation sequence by user(s).

In another embodiment, the wireless receiver 30 is an HF radio receiver. The wireless receiver 30 receives the uniquely coded information from the wireless transmitter 20. If the coding is not a correct match, the system ignores the transmission. A microprocessor 32 is required to decode the information and post the information. This ensures that other mailbox monitors located in mailboxes nearby are not erroneously decoded. A previously-recorded audible and/or video message or both can be interactively played back using voice commands, or a real time live audible sounds, image(s) or video streams from the inside of the mailbox 60, or an alarm of an audible intermittent tone, or a winking LED, or in any combination, can be activated when the wireless receiver 30 receives the correct code indicating that the mailbox 60 carrier service door has been opened.

The wireless receiver 30 may provide the user the functionality to visually differentiate between whether outgoing mail has actually left the mailbox 60 and/or if new mail has arrived or not. An IR receiver and/or an audio microphone can be used to execute the reset of the alarm. The IR sensor will respond to any TV/VCR IR "clicker" and/or the microphone will reset with a loud, nearby "clap" of hands and/or preprogrammed voice command(s). A display on the front of the wireless receiver 30 may indicate the time elapsed since the mailbox 60 carrier service door was opened (duration of alarm). Since the elapsed time, not the exact time, is needed, time setting buttons may be eliminated.

The wireless receiver 30 accepts a digital image(s) or video stream or audio Bitstream sent from the wireless transmitter 20, or in any combination that is programmed by the user. The microprocessor 32 receives the digital image Bitstream and composes it into a graphic image suitable to be displayed on the video monitor 34, or if audio, into audible sound. Furthermore, the The wireless receiver 30 may respond to voice activated commands, initiated via a voice-recognition circuit, when controlling all wireless receiver 30 features, and will also respond to email commands from any Internet based computer or computing capable device(s) capable of providing the right activation sequences. The processor 32 may adapt to and receive other monitoring devices. By way of example and not limitation, wireless solar security lights with attached cameras and/or wireless solar surveillance cameras may be used as other monitoring devices. These devices may interact with the wireless receivers' unique identifier. The wireless receiver 30 may accept a portable power source which includes the use of solar cells to charge the system and may be plugged into the mains (The dwellings electric current).

In either case when using the mains (The dwellings electric current) or solar cells. An internal backup system will hold the data for a period of time if the current is ever lost. The wireless receiver 30 may have a built in video monitor and a 2 Line Wireless Speaker Telephone & Answering System. On-Screen programming, and the unit is equipped with all RCA jacks required. In some cases the wireless receiver 30 can be built into a Television Set or PC (Personal Computer).

The sensor 12 and wireless transmitter 20 may be coupled with a United States Postal Mailbox, as specified by the United States Postal Service regulations and procedures. In yet another embodiment, the wireless transmitter includes an alarm 40. The device 10 further includes a remote transmitter 50, wherein upon the wireless receiver 30 detecting a transmission from the remote transmitter 50, the wireless receiver 30 generates a response. The wireless receiver 30 communicates with the remote transmitter 50 via a wireless telecommunications network. The wireless receiver 30 may communicate with the remote transmitter 50 via a voice recognition system.

The response generated by the wireless receiver 30 includes a system reset, which resets the monitoring system. The alarm 40 may be reset as a generated response. The remote transmitter 50 may include an Infrared remote transmitter.

In another embodiment, the wireless transmitter 20 includes a theft/vandalism deterrent system. The deterrent system may include a scanning device to provide data corresponding to the contents of the mailbox 60. By way of example and not limitation, the scanning device may include an infrared scanning device. The wireless receiver 30 may be coupled with a wireless telecommunication system. The wireless receiver 30 includes a transmitter to provide communication via a remote source, such as the wireless transmitter 20 or the remote transmitter 50.

The wireless transmitter 20 provides the user with data corresponding to the contents of the mailbox 60. Such data may be retrieved upon a request by the user initiating a data retrieval. This functionality may include a wireless receiver 30 having a voice recognition system to provide the user with an access to the data. The wireless transmitter 20 may communicate via a unique identification code to provide a unique location identifier. This enables a proper address identification.

The wireless receiver 30 may communicate via a wireless telecommunication networking system. The wireless receiver 30 may respond to preprogrammed sounds, voice commands, and generated signals. In an embodiment, the wireless receiver 30 displays a time elapsed from the mailbox 60 door open time.

Another embodiment includes a wireless transmitter 20 to store a mailbox information data packet. The mailbox information data packet includes information corresponding to the contents of mailbox 60. The wireless transmitter 30 may code and then transmit a graphic image or audio stream corresponding to said mailbox information data packet. The wireless transmitter 30 may include a Global Positioning Satellite (GPS) device. This device may be included in the anti-terrorist functionality of the present invention. If the wireless transmitter 30 is moved from its original position, the alarm 40 may be initiated.

The wireless receiver 30 may store a mailbox information data packet which corresponds to the contents of the mailbox 60. In an embodiment, the wireless receiver 30 may decode a graphic image or an audio stream corresponding to the mailbox information data packet.

Figure 2:
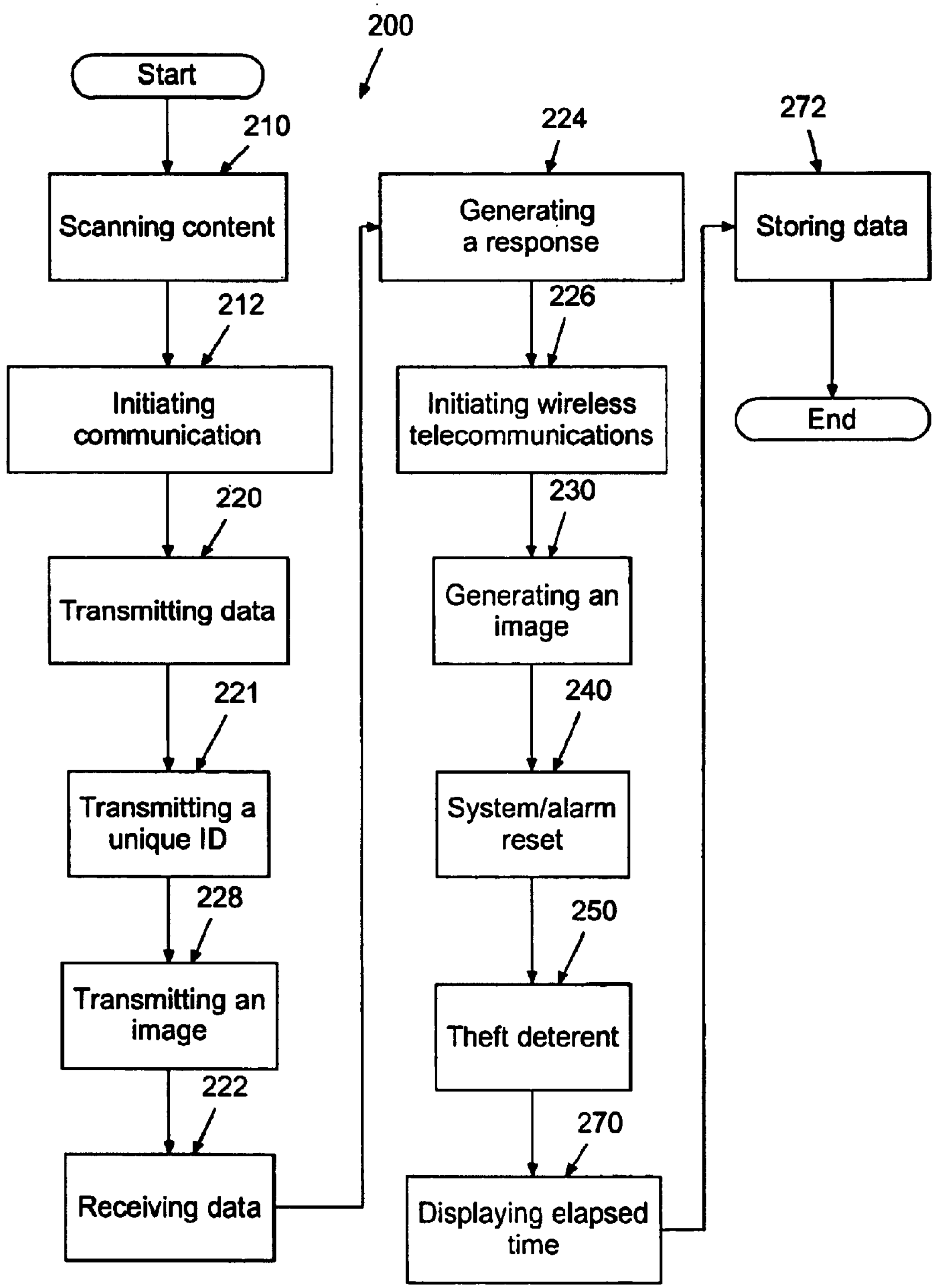
FIG. 2 illustrates a flowchart useful in describing an exemplary method of the present invention.

Now referring to FIG. 2 which illustrates a flowchart useful in describing an exemplary method of the present invention. Provided is a method 200 for monitoring a communication system to provide a user with a data corresponding to a content of the communication system. The method 200 begins with scanning the content via a sensor to provide the data regarding the content of the communication system, as indicated in step 210. Next the wireless transmitter 20 transmits to data, as indicated at step 220. The wireless receiver 30 then receives the data, as indicated at step 222.

Next an image may be generated corresponding to the contents of the mailbox 60, as indicated at step 230. An embodiment provides that the step of generating an image includes the step of displaying the image on the video monitor 34. Upon transmission, a video camera 24 or microphone 26 data packet may be accessed.

In an embodiment, the communication system may be a mailbox. The sensor 12 may coupled with a United States Postal Mailbox. The method 200 may further include the steps of initiating communication via the remote transmitter 50, as indicated at step 212, and generating a response via the wireless receiver 30 upon detecting a transmission from the remote transmitter 50, as indicated at step 224. The wireless receiver 30 may communicate with the remote transmitter 50 via a wireless telecommunications network. A voice recognition system may also be included in the communication within the device 10.

A response may be generated via the wireless receiver 30 pursuant to an incoming signal. The response may include the step of resetting the system and alarm, as indicated at step 240. The initiating communication may include the step of transmitting an Infrared remote signal, as indicated at step 240. The method 200 may further include the step of initiating a theft/vandalism deterrent system, as indicated at step 250. In an embodiment, step 250 includes the step of scanning the content of the communication system, as indicated in step 210. The scanning may be via an infrared scanning device.

The receiving the data via a wireless receiver at step 222 may include the step of communicating via a wireless telecommunication system, as indicated at step 226. In yet another embodiment, the method 200 includes the step of transmitting the data via the wireless transmitter 20 and wireless receiver 30 to provide the user with the data, as indicated at step 220. The transmitting may be initiated upon a request by the user. Such request may be detected via a voice recognition system, a voice command a preprogrammed sound or a particular signal.

Transmitting the data in step 220 may include the step of transmitting via a unique identification code to provide a unique location identifier, as indicated at step 221. Method 200 may further include the step of displaying a time elapsed from a mailbox door open time, as indicated at step 270. The wireless transmitter 20 may store the mailbox information data packet corresponding to the contents of the mailbox 60, as indicated in step 272.

Transmitting the data 220 may further include the step of transmitting a graphic image corresponding to said mailbox information data packet, as indicated at step 228. The information data packet may contain data regarding an audio or video stream transmission from the wireless transmitter 20. A graphic image corresponding to the mailbox information data packet may also be transmitted and displayed via the video monitor 34.

Figure 3:
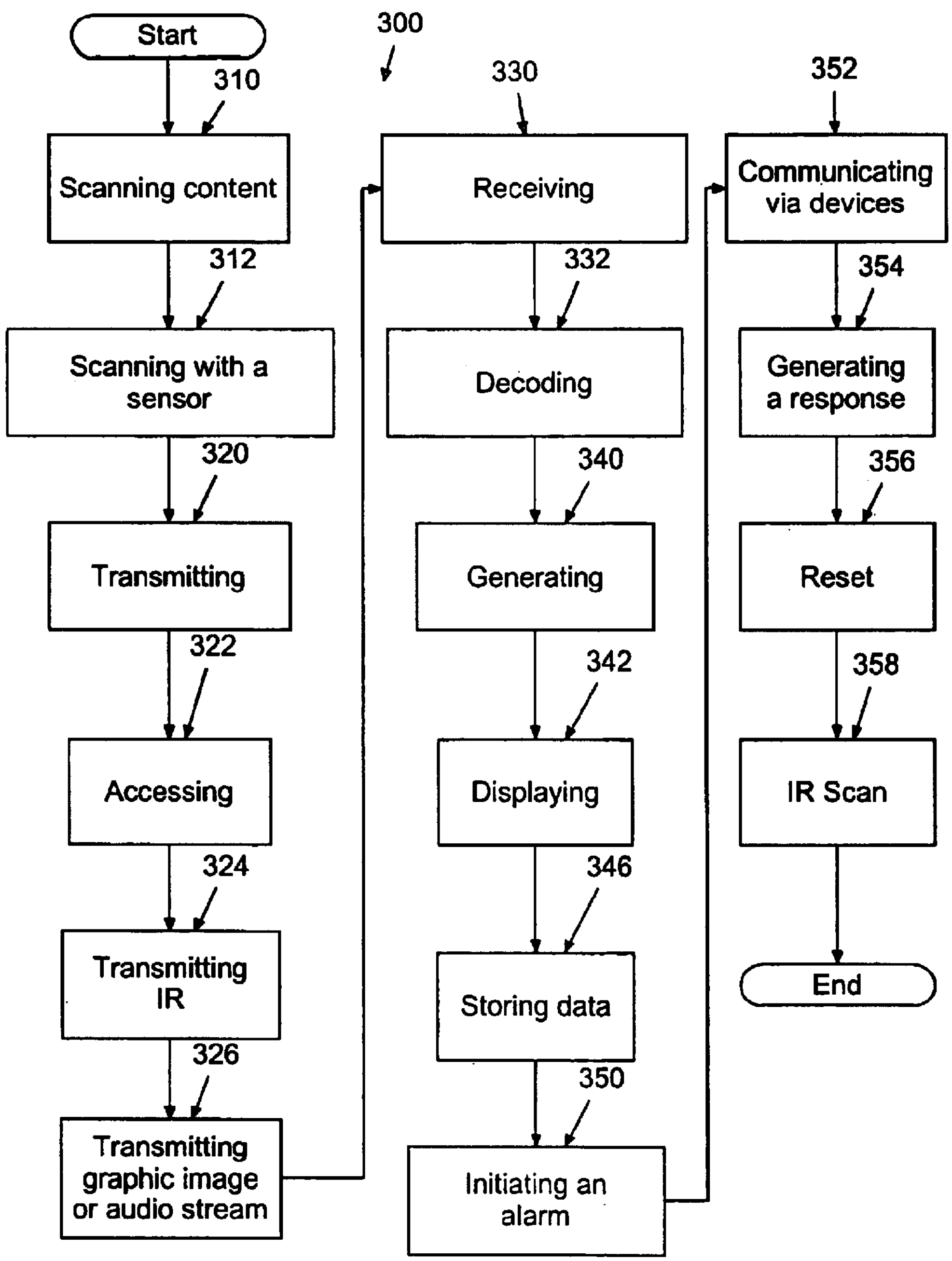
FIG. 3 illustrates another embodiment of the present invention including a computer readable medium containing programming which when executed performs an anti-terrorist communication monitoring procedures.

FIG. 3 illustrates another embodiment of the present invention including a computer readable medium containing programming which when executed performs an anti-terrorist communication monitoring procedures. The medium 300 performs the following procedures including: scanning a content of a communication system to provide a data regarding the content of the communication system, as indicated at procedure 310, transmitting the data via the wireless transmitter 20, as indicated at procedure 320, receiving the data via the wireless receiver 30, as indicated at procedure 330, and generating an image, wherein said image corresponds to the contents of the mailbox 60, as indicated at procedure 340.

In an embodiment, scanning a content of a communication system, as indicated at procedure 310, includes the procedure of scanning via a sensor 12, as indicated at procedure 312. The sensor 12 may be coupled with a United States Postal Mailbox. Procedure 340 of generating an image may include the procedure of displaying the image on the video monitor 34, as indicated at procedure 342. Transmitting the data via the wireless transmitter 20, as indicated at procedure 320, may include the procedure of accessing a video camera 24 or microphone 26 data packet, as indicated at procedure 322.

The communication system monitored by the medium 300 may include a mailbox. As such, the wireless transmitter 20 transmitting the data may be coupled with a United States Postal Mailbox. The medium 300 may include a procedure utilizing a solar energy internal capacitor as a power source.

Medium 300 may further include the procedure of initiating an alarm, as indicated at procedure 350. The medium 300 may further include the procedures of initiating communication via the remote transmitter 50, as indicated at procedure 352, and generating a response via the wireless receiver 30 upon detecting a transmission from the remote transmitter 50, as indicated at procedure 354. The wireless receiver 30 may communicate with the remote transmitter 50 via a wireless telecommunications network, and a voice recognition system.

The procedure at 354 may include the procedure of resetting the system 10 or the alarm 40, as indicated at procedure 356. The medium 300 may include the procedure of transmitting an Infrared remote signal, as indicated at procedure 324. A theft/vandalism deterrent system may be initiated by the medium 300. Such imitation may occur during the scanning of the contents of the mailbox 60. The scanning may include an Infrared scanning procedure, as indicated at procedure 358.

Communication may occur within the medium 300 via a wireless telecommunication system. The wireless transmitter 20 transmits data regarding the contents of the mailbox 60 to the wireless receiver 30 to provide the user with the data corresponding to the mailbox 60. It may be initiated upon a request by the user by means such as voice or signal recognition including a unique identification code to provide a unique location identifier.

In an embodiment of the present invention, the medium 300 includes the procedure of displaying a time elapsed from a mailbox 60 carrier service door open time, as indicated at procedure 342. This time occurs when the mailbox 60 carrier service door is opened. The information regarding the contents of the mailbox 60 may be stored, as indicated at procedure 346.

Transmitting the data at procedure 320 may include the procedure of transmitting a graphic image or audio stream corresponding to said mailbox information data packet, as indicated at procedure 326. Receiving the data at procedure 330 may include the procedure of decoding a graphic image or audio stream corresponding to said mailbox information data packet, as indicated at procedure 332.

While the invention has been described in detail with reference to preferred embodiments thereof, it will be apparent to one skilled in the art that various changes can be made, and equivalents employed, without departing from the scope of the invention.

What is claimed is:

1. An anti-terrorist communication monitoring device for providing a user with a data regarding a content of a communication system, comprising:

- a sensor to provide the data regarding the content of the communication system, which is a United States Postal Mailbox;
- a wireless transmitter including
  - a power supply,
  - a video camera, and
  - a microphone; and
- a wireless receiver including
  - a security processor to provide an anti-terrorist function,
  - a video monitor to provide for a display of the data regarding the content of the communication system, and
  - a circuit to decode and generate an image, wherein said image is to be displayed on said video monitor.

2. The device according to claim 1, wherein the sensor comprises an Infrared sensor.

3. The device according to claim 1, wherein the communication system comprises a mailbox.

4. The device according to claim 1, wherein said wireless transmitter is coupled with a United States Postal Mailbox.

5. The device according to claim 1, wherein the power supply of said wireless transmitter includes a solar energy internal capacitor.

6. The device according to claim 1, wherein said wireless transmitter further includes an alarm.

7. The device according to claim 1, further comprising a remote transmitter, wherein upon said wireless receiver detecting a transmission from said remote transmitter, said wireless receiver generates a response.

8. The device according to claim 7, wherein said wireless receiver communicates with said remote transmitter via a wireless telecommunications network.

9. The device according to claim 7, wherein said wireless receiver communicates with said remote transmitter via a voice recognition system.

10. The device according to claim 7, wherein said response includes a system reset.

11. The device according to claim 7, wherein said response includes an alarm reset.

12. The device according to claim 7, wherein said remote transmitter includes an Infrared remote transmitter.

13. The device according to claim 1, wherein said wireless transmitter includes a theft/vandalism deterrent system.

14. The device according to claim 13, wherein said theft/vandalism deterrent system includes a scanning device to provide the data.

15. The device according to claim 14, wherein said scanning device includes an infrared scanning device.

16. The device according to claim 15 wherein said scanning device provides for a detection of a substance contained within the contents of the mailbox.

17. The device according to claim 1, wherein said wireless receiver is coupled with a wireless telecommunication system.

18. The device according to claim 17, wherein said wireless receiver includes a voice recognition system to provide use with an access to the data.

19. The device according to claim 1, wherein said wireless receiver includes a transmitter.

20. The device according to claim 1, wherein said wireless transmitter provides the user with the data.

21. The device according to claim 20, wherein the data is retrieved upon a request by the user initiating a data retrieval.

22. The device according to claim 1, wherein said wireless transmitter communicates via a unique identification code to provide a unique location identifier.

23. The device according to claim 1, wherein said wireless receiver communicates via wireless telecommunication.

24. The device according to claim 1, wherein said wireless receiver responds to a preprogrammed sound.

25. The device according to claim 1, wherein said wireless receiver responds to a voice command.

26. The device according to claim 1, wherein said wireless receiver displays a time elapsed from a mailbox door open time.

27. The device according to claim 1, wherein said wireless transmitter stores a mailbox information data packet.

28. The device according to claim 1, wherein said wireless transmitter codes and transmits a graphic image corresponding to said mailbox information data packet.

29. The device according to claim 1, wherein said wireless transmitter codes and transmits an audio stream corresponding to said mailbox information data packet.

30. The device according to claim 1, wherein said wireless receiver stores a mailbox information data packet.

31. The device according to claim 1, wherein said wireless receiver decodes a graphic image corresponding to said mailbox information data packet.

32. The device according to claim 28, wherein said wireless receiver decodes an audio stream corresponding to said mailbox information data packet.

33. The device according to claim 1, wherein said wireless transmitter includes a Global Positioning Satellite system.

* * * * *